UNITED STATES PATENT OFFICE.

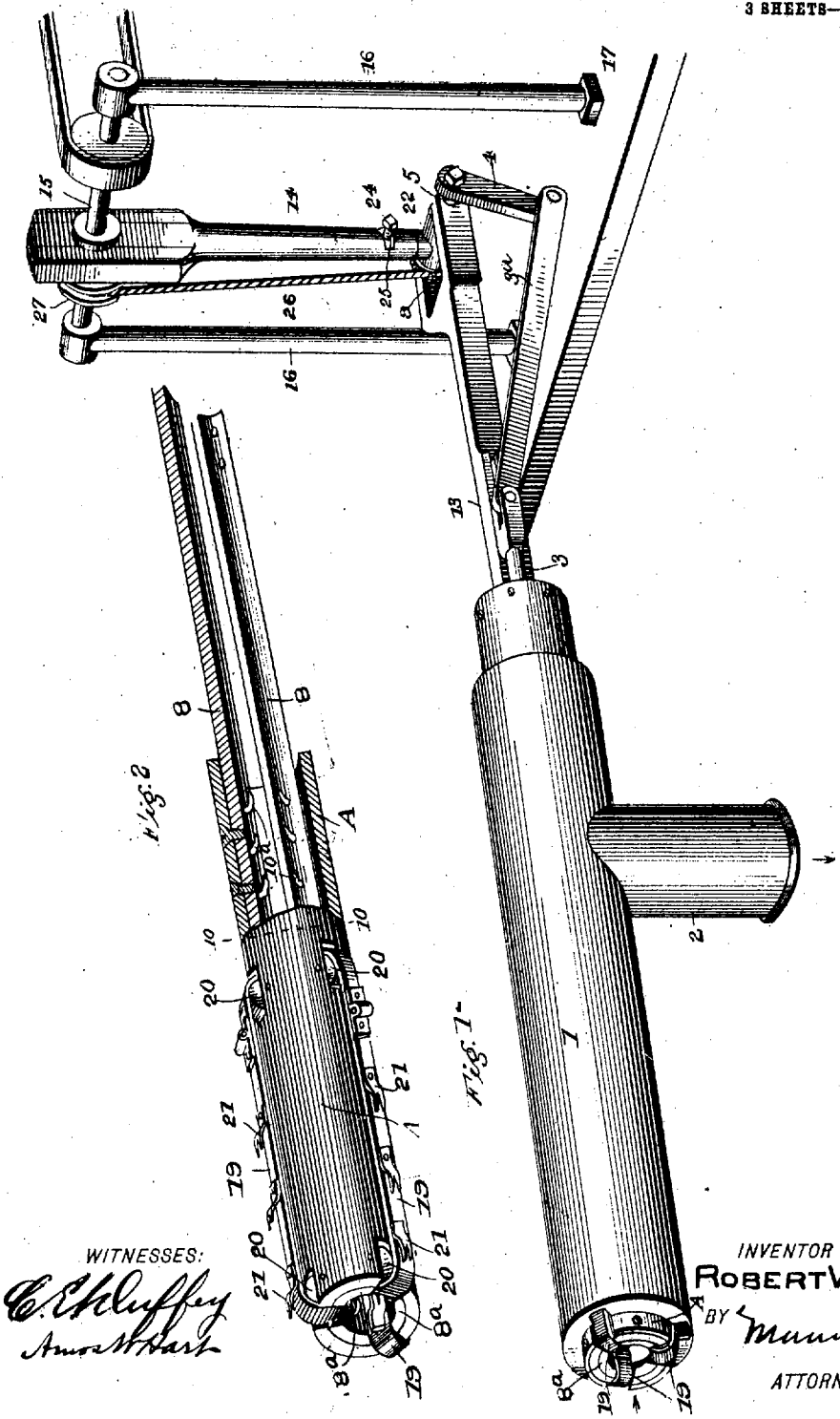

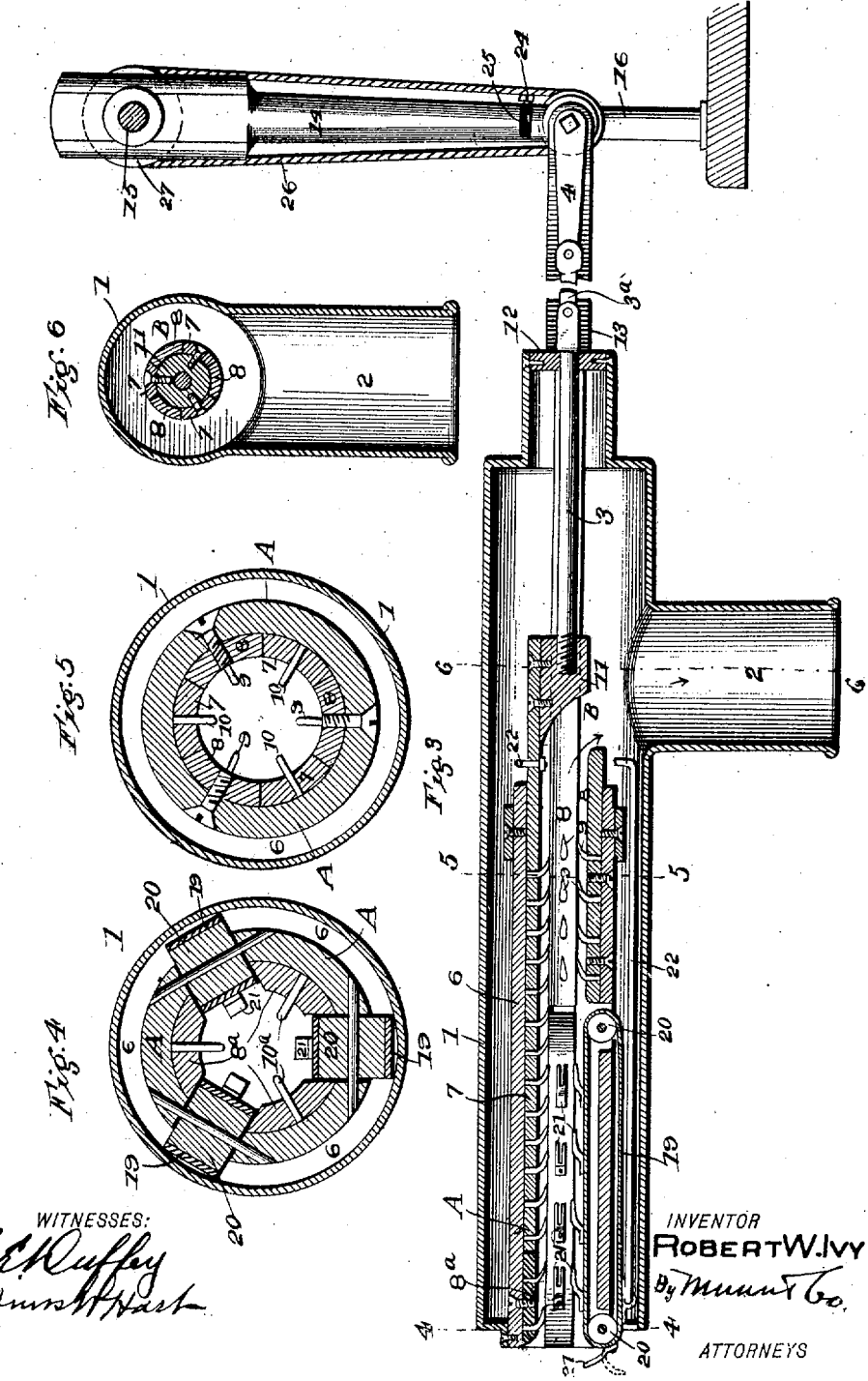

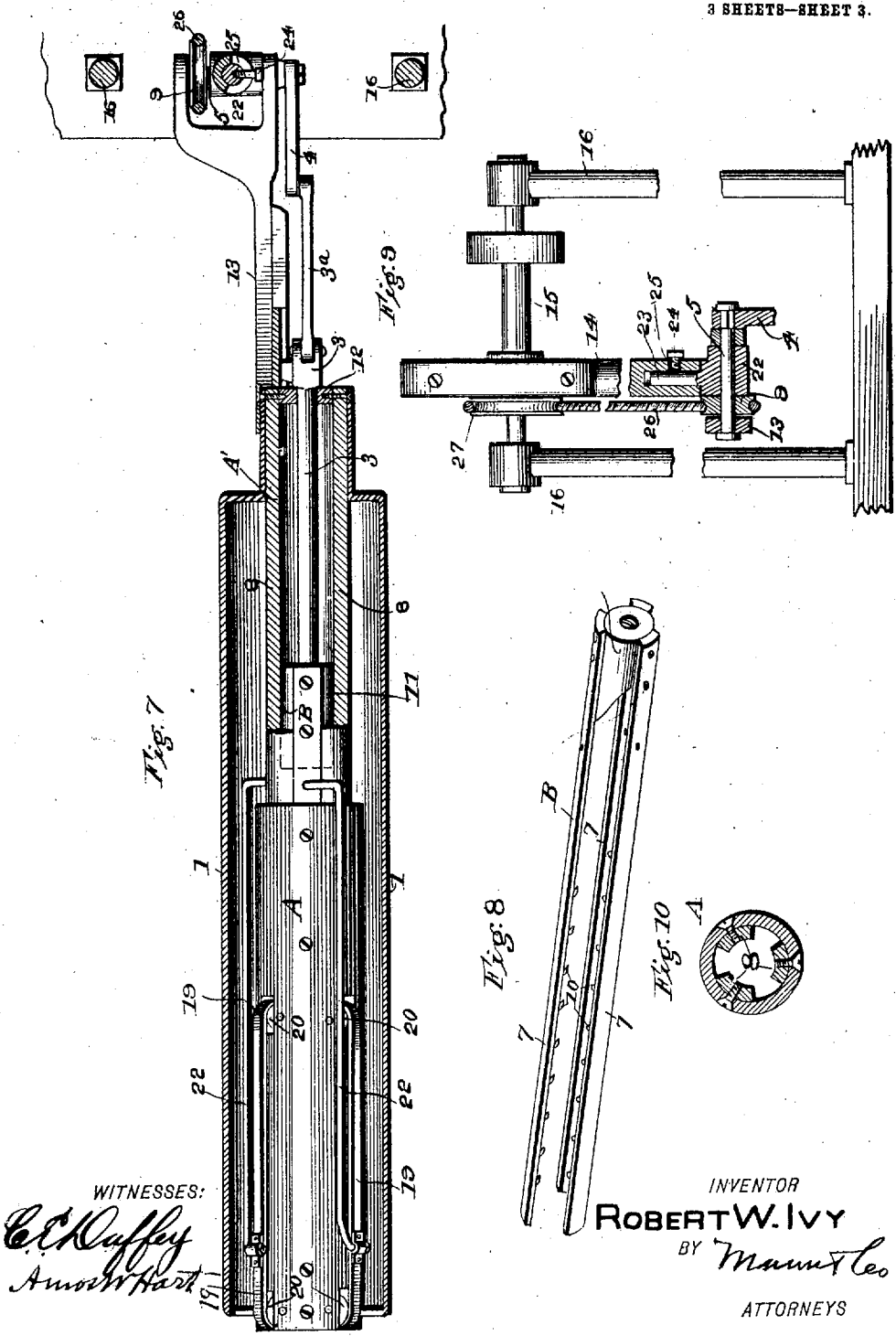

ROBERT W. IVY, OF NEW LONDON, NORTH CAROLINA.

COTTON-PICKER.

No. 835,949.

Specification of Letters Patent.

Patented Nov. 13, 1906.

Application filed March 12, 1906. Serial No. 305,603.

*To all whom it may concern:*

Be it known that I, ROBERT W. IVY, a citizen of the United States, residing at New London, in the county of Stanley and State of North Carolina, have made certain new and useful Improvements in Cotton-Pickers, of which the following is a specification.

My invention is an improvement in that class of cotton-pickers in which the picking devices proper are dirigible by hand, a portion of the mechanism being driven by means located upon a wagon or wheeled frame, the operators being seated upon platforms supported from the latter and manipulating the picking devices in such manner as to bring them in contact with the cotton held in the open bolls as the machine advances, the cotton being thus extracted and carried back into a suitable receptacle.

My invention is more particularly an improvement upon that forming the subject of my Patent No. 568,351. In such former invention a series of endless toothed belts were caused to travel on pulleys arranged in a tubular cotton-receiver adapted to be held and manipulated manually, the belts being caused to travel constantly in one direction by means of gearing connecting with a power-driven shaft and the cotton being carried back to and between toothed bars, and thus crowded or forced backward into a suitable receptacle. In my present invention toothed belts are caused to reciprocate instead of constantly traveling in one direction, they being suitably connected with a toothed frame which is reciprocated by mechanism actuated from a power-driven shaft located upon the wagon-frame. Various advantages have been attained by my improvement, as will hereinafter appear.

In the accompanying drawings, Figure 1 is a perspective view of my invention. Fig. 2 is a perspective view, part being broken away and shown in section, of the cotton-picker proper. Fig. 3 is a vertical and longitudinal section of the invention. Fig. 4 is an enlarged cross-section on the line 4 4 of Fig. 3. Fig. 5 is a similar section on the line 5 5 of Fig. 3. Fig. 6 is a like section on the line 6 6 of Fig. 3. Fig. 7 is a horizontal section of the invention, the plane of section being at right angles to that shown in Fig. 3. Fig. 8 is a perspective view of the reciprocating toothed frame. Fig. 9 is in part a vertical transverse section and in part an elevation illustrating the universal joint by which the picking mechanism proper is connected with the driving mechanism. Fig. 10 is a cross-section on the line 10 10 of Fig. 2.

I will first describe the picker or picking mechanism proper. The two chief parts of the same are indicated by the letters A B. (See especially Figs. 2 and 8.) As indicated in Figs. 1, 3, and 7, these parts are inclosed by a sheet-metal casing 1, the tubular part A being attached thereto at the outer end and extending backward to a pendent delivery spout or mouth 2, through which the cotton discharges into a receptacle or into a tubular conductor leading to a receptacle. The part B reciprocates within the part A, it being for this purpose connected by a rod 3 and link 3ª with the crank 4, which is mounted on a driven shaft 5, as will be further explained. The tubular part A is the cotton-receiver. The rear portion of its cylindrical body 6 (see Fig. 5) is provided internally with longitudinal grooves in which the arms 7 of the part B, that constitutes the cotton-retractor, are arranged. The grooves referred to separate internal longitudinal ribs 8, which are provided with rearwardly-curved teeth 9. It will be noted (see especially Fig. 8) that the arms 7 of the retractor B are similarly provided with rearwardly-projecting teeth 10. The arms 7 are secured at their rear ends to a head 11, to which the rod 3, before referred to, is detachably connected. The rod slides in a bearing 12, (see Figs. 3 and 7,) provided at the rear end of the extension A' of the receiver A. The latter, together with the casing 1, is rigidly connected with a bar 13, (see Figs. 1, 3, and 7,) which is connected with a vertical arm 14, that swings on a horizontal shaft 15, having its bearings in standards 16, which are fixed on a platform 17, forming an attachment of a wheeled vehicle upon which the operator is supported and carried while manipulating the picking mechanism now being described. The operator holds the sheet-metal casing 1 in the hand and directs the front end of the receiver A to the open bolls, and the picking and retracting devices extract the cotton therefrom. The means by which this is immediately effected are endless toothed belts 19. (See Figs. 2, 3, 4, and 7.) The belts are three in number, the same being arranged longitudinally of the tubular receiver A and spaced equidistantly from each other, as indicated in Fig. 4. They run on pulleys 20, which are mounted rotatably on fixed axles, the rear pulley being located in a slot near the middle of the tubular body 6 of the receiver. Thus the outer run of the belts is exterior to the body 6, and the inner run is within the same. The several belts are provided with forked spring-teeth 21, these being applied, however, only to such portion of the belts as enters and passes inward in the body 6. The belts are caused to travel—that is, to reciprocate—by means of rods 22, which, as shown in Fig. 7, are connected with the bars 7 of the retractor B. Thus the toothed bars 7 are caused to advance or enter the receiver A at the same time that the toothed portion of the belts enters and passes backward in the receiver A. It will be perceived (see Fig. 3) that the belts 19 are arranged in alinement with the toothed bars 8, (see also Fig. 5,) the same constituting a fixed attachment of the tubular body 6, while the toothed bars 7 of the retractor B are arranged circumferentially in grooves or spaces between the belts, and when pushed forward in the receiver A they extend nearly to the front end of the same—that is to say, to the short toothed bars 8ª, arranged at the mouth or outer end of the receiver. It will now be understood that if the mouth of the receiver A be held in contact with the cotton of an open boll, the retractor B being reciprocated, the teeth 21 of the belts 19 will enter the cotton and extract it from the boll and carry it into and backward in the receiver, where the teeth 10ª of the short bars 8ª will prevent it passing out as the belts travel forward, the teeth of the belts then releasing or freeing themselves from the cotton, and at the same time the teeth 10 of the retractor-bars 7 engage the cotton and carry it backward until it is caught by the teeth 9 of fixed bars 8, constituting part of the receiver, the cotton being thus crowded backward and finally discharged from the retractor (see Fig. 3) into the delivery-tube 2, whence it passes into a flexible conductor or immediately into a receptacle. The forked teeth 21 of the endless belts constitute a most effective means for seizing the cotton and extracting it from the bolls, while the arrangement of toothed ribs within the mouth of the receiver serves as a primary means for holding the cotton when the toothed portions of the belts again travel outward, and the retractor-bars extending far forward and alongside the belts take hold of the cotton and carry it backward at each reciprocation so that a constant stream of cotton travels through the receiver, one portion crowding another until it is delivered into the pendent tube 2. The operation is effected with minimum friction of the working parts. The teeth 21, attached to the belts, are made of spring-steel of such thinness that they are adapted to bend and turn backward, as indicated in Fig. 3, in case they should encounter a twig, limb, or stalk of sufficient size and rigidity to offer any serious obstruction.

It will be seen that the operation of the device, so far as the operator is concerned, consists in merely holding the mouth or open front end of the receiver A to the open bolls, and this is done rapidly and without great effort. The rotation of the crank 4 imparts the required reciprocating movements to the retractor B and the picker-belts, as has been already sufficiently indicated. It will be seen, Figs. 1, 3, and 7, that the rear end of the bar 13, which is rigidly connected with the receiver A, is forked to adapt it for attachment to the crank-shaft 5, which is suitably supported and journaled in a T-head 22, having, as indicated in Fig. 9, a stem 23, that enters a socket formed in the lower end of the bar 14, that swings on the driven shaft 15. The stem 23 is held in the socket by means of screw 24, which passes through an arc-slot 25, formed in the bar 14. (See Fig. 7.) It is thus apparent that the picking mechanism proper—that is to say, the parts A B—may be turned horizontally by means of this joint connection with the swinging bar 14, and since the latter is free to swing in a vertical plane forward and back it is further apparent that I thus provide a universal joint between the picking mechanism proper and the shaft 15. This enables the picking mechanism proper to be manipulated in any direction without in any way affecting the operation of the reciprocating parts by which the cotton is picked and carried backward. The crank-shaft 5 is driven by a belt 26, that runs on a pulley 27, keyed on the driven shaft 15, and thus revolving therewith. While I illustrate a belt for this purpose, I may in practice employ its well-known substitute—to wit, a shaft and bevel-gears.

From the foregoing description it will be understood that as the machine progresses slowly through the field alongside a cotton-row the several operators carried on the machine are enabled to readily direct the gathering or picking devices to the open bolls without damage to the stalk or plant or any unopen bolls, the picking mechanism being operated automatically and doing its work most effectively and extracting the cotton cleanly and perfectly, as by hand.

What I claim is—

1. A cotton-picking mechanism proper consisting of a tubular receiver having interior, longitudinal, toothed ribs, a retractor comprising toothed bars arranged and adapted to slide between the ribs of the receiver toothed endless belts arranged on the front portion of the receiver, their inner runs being within the longitudinal passage of the receiver, and devices connecting their outer runs with the slidable retractor whereby they are reciprocated simultaneously with the latter, so that their inner runs move forward as the retractor moves back, and vice versa, and means for imparting reciprocation to the retractor, substantially as described.

2. The combination, with a driven shaft and a bar pendent from and swinging loosely thereon, of cotton-picking mechanism comprising a tubular receiver having a rigid bar extended rearward and connected with the aforesaid pendent bar, a toothed retractor adapted to reciprocate within the receiver, a crank-shaft journaled in the lower end of the pendent bar, a rod connecting the crank with the retractor, and means for driving the said crank-shaft, the same being operatively connected with the driven shaft, as described.

3. In cotton-picking mechanism of the class indicated, a receiver comprising a tubular body having internal longitudinal ribs spaced apart and provided with teeth projecting rearwardly in the central passage of the receiver, and a surrounding casing to which the receiver proper is secured, the same being provided with a lateral discharge-opening, substantially as described.

4. In cotton-picking mechanism of the class indicated, the combination with the tubular receiver, and belts running on pulleys arranged in slots in the body of the receiver, of a retractor comprising a head and toothed bars extending forward therefrom, and rigid rods connected with the belts exterior to the receiver and extending rearward and connected with the retractor whereby the belts and retractor are operated simultaneously, the belts being caused to travel to carry cotton into the receiver as the toothed retractor advances to seize it, substantially as described.

ROBERT W. IVY.

Witnesses:
W. M. IVEY,
J. B. PALMER.